A. DUGHERA.
FREE WHEEL DEVICE.
APPLICATION FILED APR. 4, 1921.

1,429,196.

Patented Sept. 12, 1922.

Inventor:
Annibale Dughera
By [signature]
Attorney.

Patented Sept. 12, 1922.

1,429,196

UNITED STATES PATENT OFFICE.

ANNIBALE DUGHERA, OF TURIN, ITALY, ASSIGNOR TO PIER GIUSEPPE BELLIA, OF TURIN, ITALY.

FREE-WHEEL DEVICE.

Application filed April 4, 1921. Serial No. 458,240.

*To all whom it may concern:*

Be it known that I, ANNIBALE DUGHERA, a subject of the King of Italy, residing at Turin, Italy, have invented certain new and useful Improvements in Free-Wheel Devices, of which the following is a specification.

This invention relates to the free wheel devices comprising two concentric revoluble members which are engaged with each other when caused to rotate in one direction and released from each other when rotated in the opposite direction.

The present invention comprises a device of this kind in which the means for interlocking the revoluble members comprise pawls pivotally mounted in either of said members and adapted to engage ratchet teeth provided on the other member, said pawls being arranged in pairs and the pawls of each pair being resiliently forced into their locking position by a common spring.

This invention further provides an arrangement of the pawls with regard to the teeth of the toothed member whereby the spring of each pair of pawls is always tensioned and the deflection of the same when the pawls run over the teeth is reduced.

Figure 1:
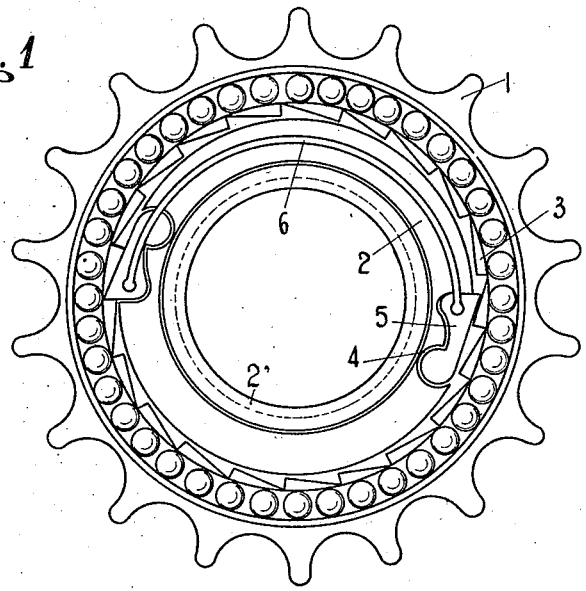
Figure 2:
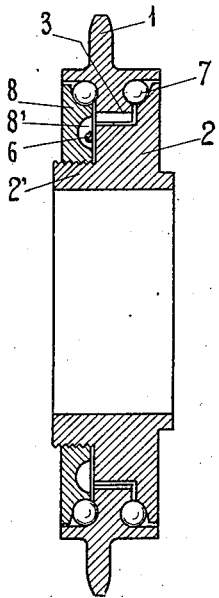

The annexed drawing shows an embodiment of the improved device according to this invention, Figure 1 being a side view of the device with the front cover ring removed and Figure 2 a central section of the device.

The drawing illustrates a free-wheel device or clutch for the sprocket pinion of the rear wheel of a bicycle or the like; said device comprising two concentric rims 1 and 2 providing facing surfaces, and the inner surface of the ring 1 having ratchet teeth 3. The inner rim 2 is provided with recesses 4 in which are seated pawls 5 adapted to engage the teeth 3 when the outer rim is rotated clockwise.

Each pawl is provided with a hole at a point remote from its pivotal axis and a spring stirrup 6 is located adjacent said rim 2 and has its ends engaged in said holes, this spring acting to force both the pawls to turn outwards around their pivots.

Said spring is preferably made of a piece of metal wire bent at right angles for the purpose of engaging the pawl holes.

Between the rims 1 and 2 are located supporting balls 7 or any other known or suitable kind of antifriction bearings and the outer rim 1 is held in position on the inner one by a ring 8 screwed on the extension 2' of the rim 2; said ring 8 providing a race for a set of bearing balls 7, and a groove 8' leaving room for the spring 6.

By this construction the pawls 5 are held in such a position by the spring 6 as to engage the teeth 3 of the rim 1, said spring having such a shape and tension as to force the pawls away from each other.

It is advisable to so position the pawls with relation to the teeth 3 that when the nose or end of one of the pawls is fully engaged within one tooth recess, the other one is about over the middle of the slope of the opposite tooth. By this arrangement, which is illustrated on the drawing, the spring member is always tensioned and the extent of its deflection when the pawls are running over the cooperating teeth is reduced.

Of course this invention is not restricted to the construction described and illustrated, it being only defined by the appended claims and a number of changes may be made without departing from the spirit of this invention.

In the device according to this invention the wire member which constitutes the spring has a considerable length and is not subject to a heavy deflection and load; the machining of the parts is reduced and the assembling operation is made very easy.

What I claim as my invention and desire to secure by United States Letters Patent is:—

1. A free wheel device, comprising concentric outer and inner rims; a cover ring secured to one rim; a pair of pawls pivoted on one rim at a comparatively-great angular distance from each other; ratchet teeth on the other rim for driving engagement by said pawls; and an arcuate spring disposed between the cover ring and the inner rim and bearing against both pawls to force them against the ratchet teeth.

2. A free wheel device, comprising concentric outer and inner rims, one of which is provided with ratchet teeth; pawls on the other rim for driving engagement with said teeth; a cover ring secured to one rim; a set of anti-friction bearings between the cover ring and the other rim; a separate set of anti-friction bearings between the two rims;

and spring means disposed between the cover ring and the inner rim for forcing the pawls against the ratchet teeth.

3. A free wheel device comprising an inner rim, an outer rim concentric with the inner one, a cover ring secured to one of said rims, antifriction means between said rims and ring, ratchet teeth on one of said rims, pawls rotatably seated in the other rim at points diametrically opposed to each other, and an arch shaped spring wire member between said ring and the pawl carrying rim, said spring member having its ends engaged with the diametrically opposed pawls and forcing them into engagement with said teeth, the respective positions of the diametrically opposed pawls and the teeth being such that when the nose of one of said pawls is engaged in a tooth recess the nose of the other pawl bears on a tooth slope.

In testimony whereof I affix my signature.

ANNIBALE DUGHERA.